(12) United States Patent
Bounds et al.

(10) Patent No.: US 9,059,952 B2
(45) Date of Patent: Jun. 16, 2015

(54) SYSTEM AND METHOD FOR DISTRIBUTING AND OPTIMIZING QUALITY AND QUANTITY OF SOCIAL MEDIA POSTS

(71) Applicant: Yapp Media, LLC, North Caldwell, NJ (US)

(72) Inventors: Darren Bounds, Jacksonville, FL (US); Eric Goldstein, North Caldwell, NJ (US)

(73) Assignee: Yapp Media, LLC, North Caldwell, NJ (US)

( * ) Notice: Subject to any disclaimer, the term of this patent is extended or adjusted under 35 U.S.C. 154(b) by 0 days.

(21) Appl. No.: 14/184,351

(22) Filed: Feb. 19, 2014

(65) Prior Publication Data

US 2015/0067076 A1    Mar. 5, 2015

Related U.S. Application Data

(60) Provisional application No. 61/874,055, filed on Sep. 5, 2013, provisional application No. 61/874,058, filed on Sep. 5, 2013.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 40/02* | (2012.01) |
| *G06Q 99/00* | (2006.01) |
| *H04L 12/58* | (2006.01) |
| *H04L 29/08* | (2006.01) |
| *G06Q 50/00* | (2012.01) |

(52) U.S. Cl.
CPC ............... *H04L 51/12* (2013.01); *G06Q 50/01* (2013.01); *H04L 67/22* (2013.01)

(58) Field of Classification Search
CPC ...................................................... G06Q 50/01
USPC .................................................. 705/1.1–912
See application file for complete search history.

(56) References Cited

U.S. PATENT DOCUMENTS

| | | | |
|---|---|---|---|
| 6,076,100 A | 6/2000 | Cottrille et al. | 709/203 |
| 2002/0174234 A1 | 11/2002 | Trovato et al. | 709/227 |
| 2003/0078972 A1 | 4/2003 | Tapissier et al. | 709/204 |
| 2006/0190281 A1 | 8/2006 | Kott et al. | 705/1 |
| 2007/0038646 A1* | 2/2007 | Thota | 707/100 |
| 2007/0294281 A1* | 12/2007 | Ward et al. | 707/102 |
| 2010/0119053 A1* | 5/2010 | Goeldi | 379/265.09 |
| 2010/0198757 A1 | 8/2010 | Cheng et al. | 706/12 |
| 2010/0325107 A1 | 12/2010 | Kenton et al. | 707/723 |

(Continued)

*Primary Examiner* — Jonathan Ouellette
(74) *Attorney, Agent, or Firm* — Pillsbury Winthrop Shaw Pittman LLP

(57) ABSTRACT

Approaches for distributing and optimizing quality and quantity of social media posts or other posts are disclosed. In certain implementations, a post may be received from a user for submission to a channel directed to a topic. A stream flow value may be determined for the channel. The stream flow value may be based on a volume of posts associated with the channel. A rating value associated with the user submitting the post may be determined. A scope of distribution of the post to one or more users accessing the channel may be determined based on the stream flow value and the rating value. In some implementations, channel instances corresponding to the channel may be provided on different device components. At least one channel instance of the channel instances on which to make the post available may be determined based on the stream flow value and the rating value.

30 Claims, 10 Drawing Sheets

(56) References Cited

U.S. PATENT DOCUMENTS

| | | | |
|---|---|---|---|
| 2011/0022602 A1 | 1/2011 | Luo et al. | 707/748 |
| 2011/0047487 A1 | 2/2011 | DeWeese et al. | 715/758 |
| 2011/0137845 A1* | 6/2011 | Ward | 706/50 |
| 2011/0191372 A1* | 8/2011 | Kaushansky et al. | 707/776 |
| 2011/0213670 A1* | 9/2011 | Strutton et al. | 705/14.73 |
| 2011/0282943 A1 | 11/2011 | Anderson et al. | 709/204 |
| 2012/0110064 A1 | 5/2012 | Chen et al. | 709/203 |
| 2012/0179752 A1* | 7/2012 | Mosley et al. | 709/204 |
| 2013/0018838 A1* | 1/2013 | Parnaby et al. | 706/52 |
| 2013/0080928 A1 | 3/2013 | Zhuang et al. | 715/758 |
| 2013/0110957 A1* | 5/2013 | Siegel et al. | 709/207 |
| 2013/0179440 A1* | 7/2013 | Gordon | 707/731 |
| 2013/0227016 A1* | 8/2013 | Risher et al. | 709/204 |
| 2014/0101611 A1* | 4/2014 | Lang et al. | 715/813 |

* cited by examiner

SYSTEM AND METHOD FOR DISTRIBUTING AND OPTIMIZING QUALITY AND QUANTITY OF SOCIAL MEDIA POSTS

CROSS-REFERENCE TO RELATED APPLICATIONS

This application claims priority to: (1) U.S. Provisional Patent Application Ser. No. 61/874,055, filed Sep. 5, 2013; and (2) U.S. Provisional Patent Application Ser. No. 61/874,058, filed Sep. 5, 2013, each of which is hereby incorporated by reference herein in its entirety. This application is additionally related to co-pending U.S. patent application Ser. No. 14/184,374, filed Feb. 19, 2014, entitled: "SYSTEM AND METHOD FOR SELECTIVE USER MODERATION OF SOCIAL MEDIA CHANNELS," which is hereby incorporated by reference herein in its entirety.

FIELD OF THE INVENTION

The invention relates to distributing and optimizing quality and quantity of social media posts.

BACKGROUND OF THE INVENTION

The advent of social media has changed the way users interact with content and one another. Social media platforms, for example, enable users to freely share information about their interests and other aspects of their lives, and respond to information shared by other users. The volume of information streamed and presented to users on typical social media platforms may, however, hinder the ability of a user to respond to or otherwise interact with the information in real-time. By way of example, spectators of a popular event (e.g., a game, a show, or other event) may access a stream of posts by other users regarding the event while the event is occurring. Generally, the spectators may be inundated with a high volume of posts regarding the event (e.g., due to the popularity of the event or other causes), along with numerous other posts that may not be related to the event. As such, a spectator's ability to respond to or otherwise interact with (and even enjoy) the event-related posts may be impeded by both the high volume of event-related posts and the unrelated posts interleaved among the event-related posts.

In addition, abusive posts, nonsense posts, or other posts with undesired characteristics on a social media channel of a social media platform may negatively affect the experience of users interacting on the social media channel. Traditionally, system administrators may suspend or ban users that submit the undesired posts to prevent those users from submitting further posts via the social media platform. An outright ban from the social media platform based on negative incidents isolated to one or more channels or circumstances may, however, result in removal of a user that might otherwise provide engaging and thoughtful posts, thereby reducing content shared via the social media platform that positively contributes to the community served by the social media platform. These and other drawbacks exist.

SUMMARY OF THE INVENTION

The invention addressing these and other drawbacks relates to methods, apparatuses, and/or systems of managing social media posts and/or users. In some implementations, a system may optimize quality and quantity of social media posts on social media channels by directing each of the channels to specific topics.

As used herein, a channel may refer to one or more media on which information may be made available from at least one source to at least one destination. As an example, a channel may allow information from one or more social streams to be distributed to one or more users. In some implementations, a channel may be directed to a topic so as to allow information from one or more social streams that are directed to the topic to be delivered to one or more users.

According to one aspect of the invention, multiple channel instances may correspond to a channel such that information placed on the corresponding channel instances may be provided to users accessing the channel. The corresponding channel instances may be hosted or managed on the same or different device components. Each device component may include a single channel instance or multiple channel instances. Device components may, for example, include partitions, virtual machines, physical machines, or other device components. Multiple channel instances on different device components may refer to the channel instances being hosted or managed on different partitions, the channel instances being hosted or managed on different virtual machines, the channel instances being hosted or managed on different physical machines, etc. It should be noted that, while various implementations are described with respect to social media channels, other types of channels may be utilized in some implementations to facilitate distribution of information.

According to one exemplary (and non-limiting) implementation, a channel topic may comprise an entity, such as a team or an individual, competing in one or more sports leagues or competitions. By limiting channels to specific topics, users accessing the channels may be alleviated of the burden of removing or ignoring unrelated posts to read, interact with, or respond to posts of interest (e.g., posts related to a channel topic).

In one implementation, the system may manage the scope of distribution of posts submitted to a channel based on, for example, a volume of posts that the channel is currently experiencing or predicted to experience, ratings of posters, or other criteria. In one scenario, the system may reduce the distribution scope when the channel is experiencing a high volume of posts, or increase the distribution scope when the channel is experiencing a low volume of posts. In another scenario, the system may increase the distribution scope when a rating of a user submitting the post(s) is high, or reduce the distribution scope when the rating of the user submitting the post(s) is low. The volume of posts, poster ratings, or other criteria may be utilized separately or in combination with one another to determine the distribution scope. Among other benefits, the rate of the posts presented to each user may be made more manageable for the user to view and/or interact with, and the quality of the posts presented to each user may be improved.

In another implementation, the system may manage the scope of distribution of posts submitted to a channel using channel instances corresponding to the channel. The volume of posts experienced (or predicted to be experienced) by the channel, the ratings of posters, or other criteria may be utilized to determine on which and/or how many channel instances posts for the channel are to be made available.

In another implementation, the system may selectively present social media posts to users. For example, the system may determine a predetermined number of the posts to make available during a given time interval to a user (e.g., a certain number of posts per minute or other time interval). The system may then determine posts to present to the user during the given time interval such that some of the posts are determined based on, for example, users relationships of the user and some of the posts are determined without regard to user relationships of the user. During the given time interval, a total number of the posts presented to the user may not exceed the predetermined number. In this way, among other benefits, a user accessing the channel will not be overwhelmed with excessive streams of posts, thereby enabling the user to more easily view, interact with, or respond to posts presented to the user.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention.

Figure 1:
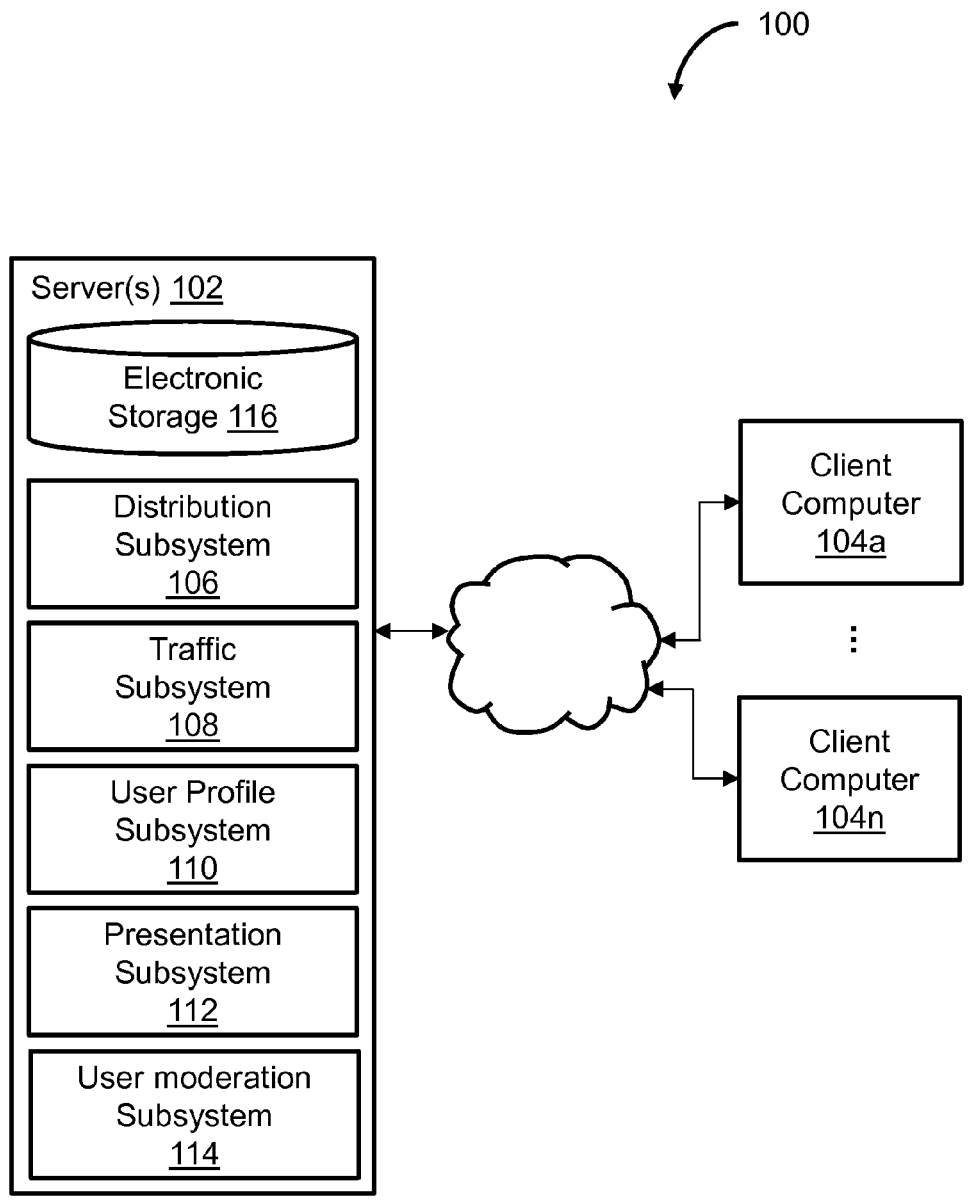
FIG. 1 is an exemplary illustration of a system for managing social media posts and users, according to an aspect of the invention.

FIG. 1 is an exemplary illustration of a system 100 for managing social media posts and users, according to an aspect of the invention. System 100 may include one or more computers and sub-systems to improve the ability of social media users to interact with or respond to posts or other information shared by other users, as well as to enhance the overall social media experience of the users. As shown in FIG. 1, system 100 may comprise server 102 (or servers 102). Server 102 may comprise distribution subsystem 106, traffic subsystem 108, user profile subsystem 110, presentation subsystem 112, user moderation subsystem 114, or other components.

System 100 may further comprise a client computer 104 (or multiple client computers 104a-104n). Client computer 104 may comprise any type of mobile terminal, fixed terminal, or other device. By way of example, client computer 104 may comprise a desktop computer, a notebook computer, a netbook computer, a tablet computer, a smartphone, a navigation device, an electronic book device, a gaming device, or other client computer. Users may, for instance, utilize one or more client computers 104 to interact with server 102 or other components of system 100.

In some implementations, the various computers and subsystems illustrated in FIG. 1 may comprise one or more computing devices that are programmed to perform the functions described herein. The computing devices may include one or more electronic storages (e.g., electronic storage 116 or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 106, 108, 110, 112, 114, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 106, 108, 110, 112, or 114 described herein is for illustrative purposes, and is not intended to be limiting, as any of subsystems 106, 108, 110, 112, or 114 may provide more or less functionality than is described. For example, one or more of subsystems 106, 108, 110, 112, or 114 may be eliminated, and some or all of its functionality may be provided by other ones of subsystems 106, 108, 110, 112 or 114. As another example, additional subsystems may be programmed to perform some or all of the functionality attributed herein to one of subsystems 106, 108, 110, 112, or 114.

Figure 2:
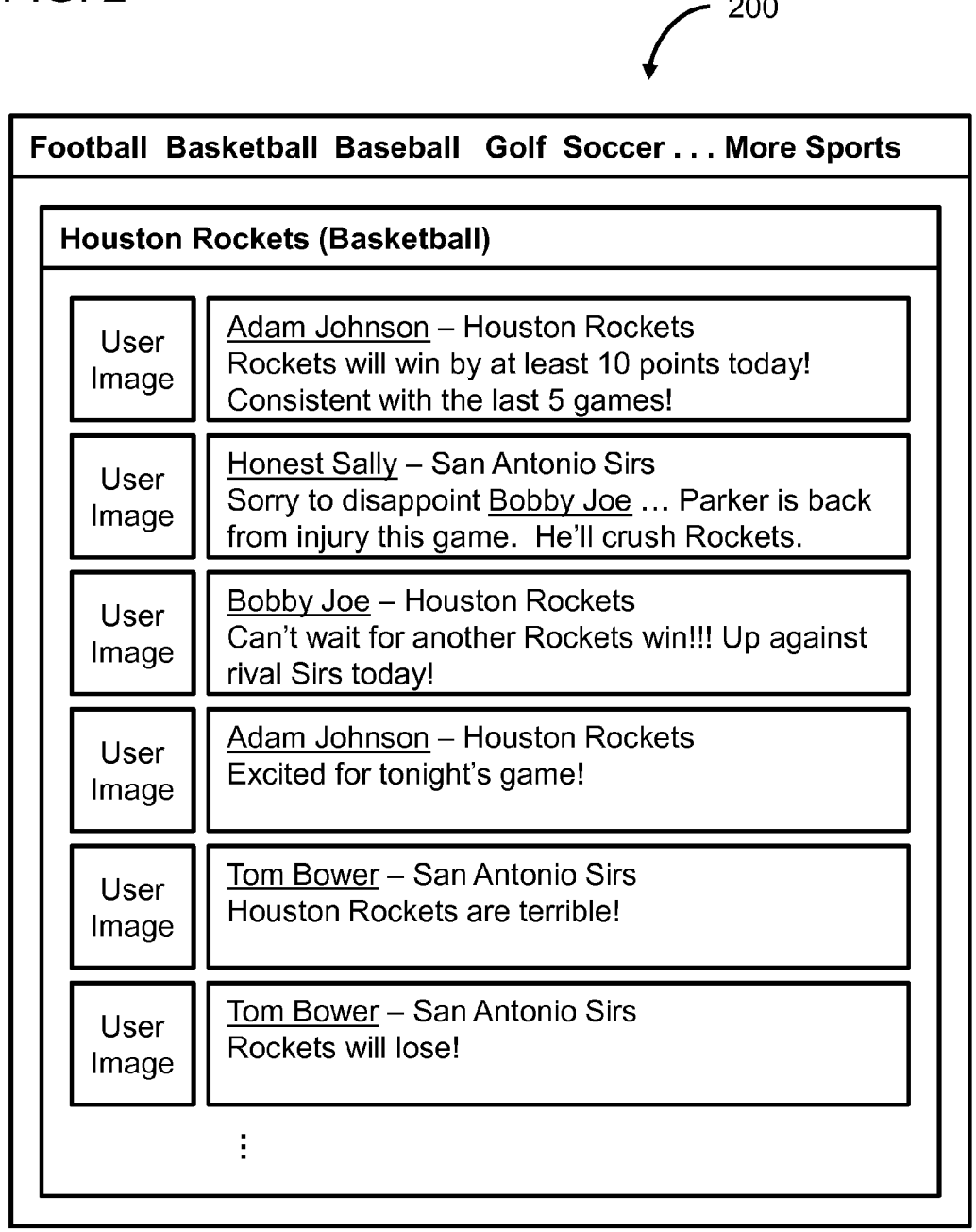
FIG. 2 is an exemplary illustration of a user interface that depicts social media posts of a channel directed to a topic, according to an aspect of the invention.

In one implementation, with respect to FIG. 2, client computer 104 may be utilized to access user interface 200 that depicts social media posts of a channel directed to a topic. As shown, the channel may be the Houston Rockets channel, and the topic may be the Houston Rockets basketball team.

Figure 3:
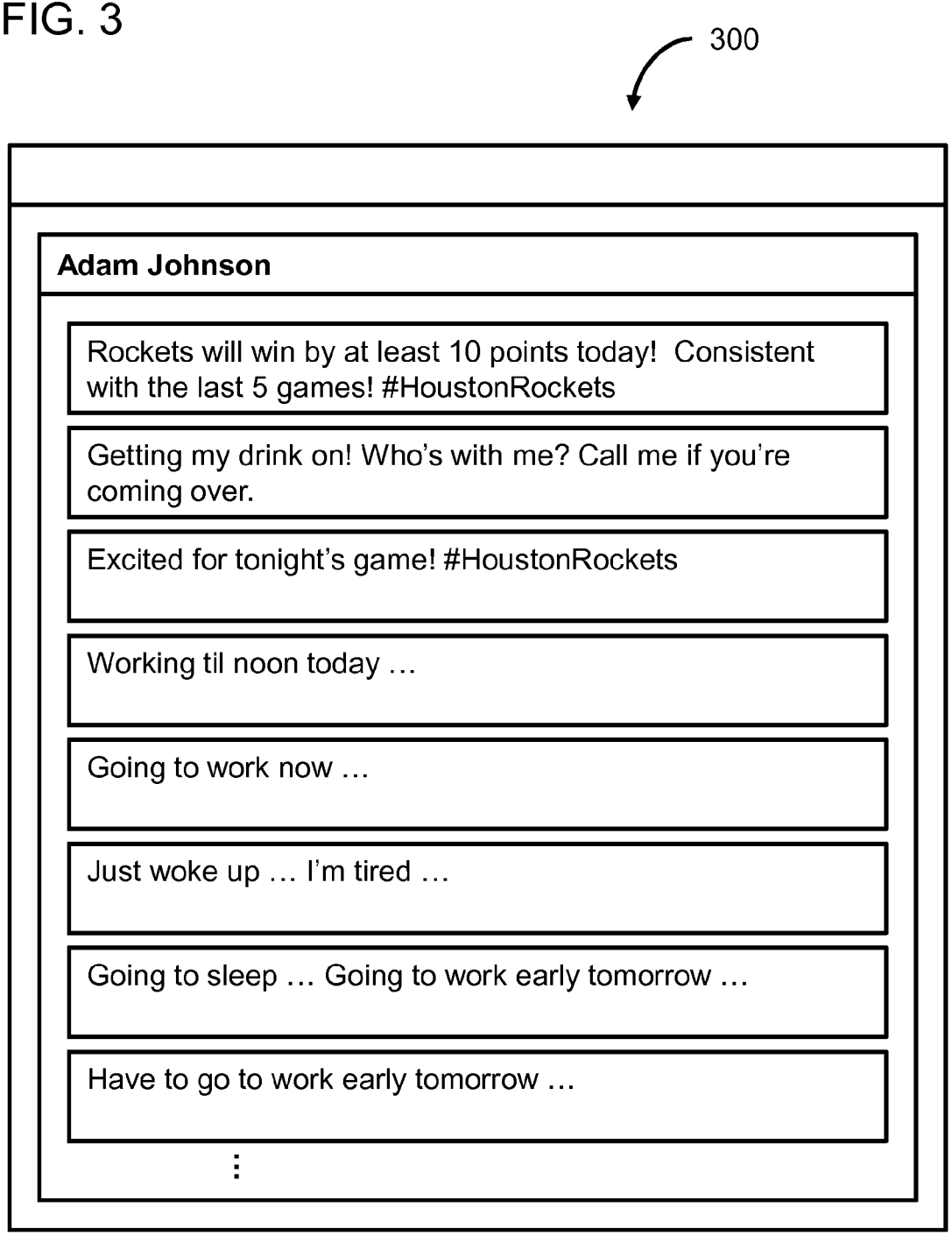
FIG. 3 is an exemplary illustration of a user interface that depicts social media posts associated with a topic interleaved with other social media posts unrelated to the topic, according to an aspect of the invention.

In another implementation, with respect to FIG. 3, client computer 104 may be utilized to access user interface 300 that depicts social media posts (attributable to a given user) associated with a topic interleaved with other social media posts unrelated to the topic. In one use case, user interface 300 may be a user interface of another social media platform that is different from the social media platform hosting or managing the Houston Rockets channel shown in user interface 200 of FIG. 2. As illustrated, users of the other social media platform may submit posts on the other social media platform with one or more triggers indicating a desire to also submit the posts to the Houston Rockets channel (e.g., "#HoustonRockets" or other triggers) or other channels hosted on the different social media platform.

Attention will now be turned to a more detailed description of various implementations comprising one or more features relating to managing social media posts and users. It should be noted that features described herein may be implemented separately or in combination with one another.

Distribution of Posts

In various implementations, distribution of social media (or other) posts to users may be facilitated based on volume of posts, ratings of posters, or other criteria. By way of example, distribution subsystem 106 may be programmed to receive a post from a user for submission to a channel directed to a topic. The post may include one or more of text, images, videos, haptic effects, or other content.

Traffic subsystem 108 may be programmed to determine a stream flow value for the channel. The stream flow value may, for example, be based on a volume of posts associated with the channel or other traffic information associated with the channel.

User profile subsystem 110 may be programmed to determine a rating value associated with a user submitting the post.

Distribution subsystem 106 may be programmed to determine a scope of distribution of the post to one or more other users accessing the channel based on the stream flow value, the rating value, a combination of the two, or other criteria.

In one implementation, the scope of distribution of the post may be greater when the stream flow value indicates a low rate of posts (e.g., a low number of posts per minute or other time interval). In another implementation, the scope of the distribution of the post may be less when the stream flow value indicates a high rate of posts (e.g., a high number of posts per minute or other time interval). In this way, among other benefits, the scope of distribution of posts may be adjusted based on the stream flow value for the channel to cause a reduction in the rate of posts presented to each individual user accessing the channel when the overall rate of posts submitted for the channel is high, or to cause an increase in the rate of posts presented to each individual user accessing the channel when the overall rate of posts submitted for the channel is low. In one implementation, a stream flow value may be measured on a scale of 0-9, although other values and/or ranges of values may be used.

In one implementation, the scope of the distribution of a post may be greater when the rating value indicates a high rating for the user. A high rating may, for example, be based on indications that the user's historical contributions to the channel (or other channels) may be highly regarded (or rated) by system administrators or other users, that the user may be trusted by system administrators or other users to provide quality posts, that the current or previous experience of other users with the user's posts may have been largely positive, etc.

In another implementation, the scope of the distribution of a post may be less when the rating value indicates a low rating for the user. A low rating may, for example, be based on indications that the user's contributions to the channel (or other channels) may not be trusted by system administrators or other users, that the current or previous experience of other users with the user's posts may have been negative, that the user or the user's posts may have been reported (or negatively rated) for exhibiting abusive or nonsense behavior, the user or the user's posts may have been muted by other users, etc. In this way, among other benefits, higher quality posts may be given additional exposure (e.g., based on the rating value of the user), while lower quality posts may be given reduced exposure, thereby improving the overall experience of users accessing the channel or other channels. In one implementation, a rating value may be measured on a scale of 0-9, although other values and/or ranges of values may be used.

In one implementation, a rating value for a user may comprise an overall rating value that is not specific to a particular channel. As such, a rating value for the user that is used for calculating a scope of distribution of a post submitted by the user may be the same regardless of the channel to which the post is being submitted.

In another implementation, a rating value for a user may be specific to a particular channel. As an example, a user may have different rating values for different team channels. In one use case, for instance, a user may have a first rating value for the New York Yankees channel, a second rating value for the Boston Red Sox channel, a third rating value for the Washington Nationals channel, and so on. As such, a scope of distribution of a post submitted by the user to the New York Yankees channel may be based on the first rating value, a scope of distribution of a post submitted by the user to the Boston Red Sox channel may be based on the second rating value, a scope of distribution of a post submitted by the user to the Washington Nationals channel may be based on the third rating value, and so on.

As another example, rating values for a user may be assigned or modified based on the user's team preferences, team rivalries, or other criteria. In one scenario, a new user may initially be assigned a relatively high rating value for the New York Yankees channel based on a determination that the New York Yankees is a favorite baseball team of the user. On the other hand, the user may initially be assigned a relatively low rating value for the Boston Red Sox channel based on a determination that the Boston Red Sox is a major rival of the New York Yankees. In a further scenario, it may be more (or less) difficult for the user to increase his/her rating value for the Boston Red Sox channel than to increase his/her rating value for the New York Yankees channel, for example, because the New York Yankees is a favorite baseball team of the user, and the New York Yankees and the Boston Red Sox are rivals. The user's rating value for the New York Yankees channel may, for instance, be increased by a first predetermined amount for submitting a threshold number of "good" posts to the New York Yankees channel. However, the user's rating value for the Boston Red Sox Channel may be increased by a second predetermined amount for submitting the threshold number of "good" posts to the Boston Red Sox channel (e.g., where the first predetermined amount is greater or less than the second predetermined amount). In one use case, for instance, the user may be required to submit a greater number of "good" posts to increase his/her rating value for the Boston Red Sox channel by a predetermined amount than the number of "good" posts required to increase his/her rating value for the New York Yankees channel by the same predetermined amount. A post may, for example, be determined to be a "good" post or a "bad" post based on direct feedback from other users (e.g., a number of "likes" vs. "dislikes" given by other users to the post, an overall rating calculated for the post based on ratings of the post by other users, or other feedback), an analysis of the content of the post (e.g., whether the content of the post includes desired characteristics, undesired characteristics, or other characteristics), or other criteria.

As another example, a rating value for a user may be affected (e.g., increased, decreased, etc.) based on a recent, current, or upcoming event. In one use case, if the user is a New York Yankees fan, the user's rating value for the Washington Nationals channel may be reduced during a predetermined time period associated with a Yankees vs. Nationals game. In another use case, the user's rating value for the Boston Red Sox channel may be reduced during a predetermined time period associated with a Yankees vs. Red Sox game. In yet another use case, a reduction of the user's rating value for the Boston Red Sox channel during a Yankees vs. Red Sox game may be greater than a reduction of the user's rating value for the Washington Nationals channel during a Yankees vs. Nationals game. The difference in the reduction of the user's ratings during the respective games may, for instance, be because the New York Yankees and the Boston Red Sox are major rivals, while the New York Yankees and the Washington Nationals are not major rivals. In this way, due to lower rating values, a scope of distribution of posts submitted by users on channels of opposing teams may be reduced during predetermined time periods associated with games in which the opposing teams play teams with which the users are affiliated (e.g., a user being a fan of a team, a team being a user's favorite team, etc.). As such, the number of offensive or potentially offensive posts (or other "bad" posts) may be proactively mitigated. For example, a user may be more inclined to submit offensive or potentially offensive posts to a channel associated with a team when that team is playing a favorite team of the user.

In some implementations, the determination of the scope of the distribution of a post may comprise processing of the stream flow value and the rating value to generate a distribution value. By way of example, a distribution value may be measured on a scale of 0-9, although other values and/or ranges of values may be used. A post associated with a high distribution value may, for example, be made available to a greater number of forums or users than a post associated with a low distribution value. As indicated, a distribution value may be affected by a stream flow value of a channel and/or a rating value of a user submitting a post to the channel. In one use case, a stream flow value of 9 may generally cause the distribution value to be 0. However, if the rating value of the user submitting the post is high (e.g., 7 or other value), the distribution value may be increased to a non-zero value based on the rating value. In another use case, a stream flow value of 0 may generally cause the distribution value to be 9. However, if the rating value of the user submitting the post is low (e.g., 2 or other value), the distribution value may be decreased.

In various implementations, user profile subsystem 110 may be programmed to obtain a first model that includes first behavioral information relating to actions of one or more other users. User profile subsystem 110 may be programmed to generate a second model that includes second behavioral information relating to actions of the user submitting a post. The determination of the rating value of the user submitting the post may comprise determining the rating value based on the first model and the second model.

In some implementations, the first behavioral information may be generated based on posts submitted by the other users or other actions by the other users for the channel or other channels. The first behavioral information may include information indicative of undesired characteristics, desired characteristics, or other characteristics for the channel or other channels. In one implementation, the undesired characteristics may correspond to characteristics of the posts or the other actions of the other users that system administrators (or users) have identified as being undesired (e.g., via reporting or other monitoring efforts). In one use case, undesired characteristics of the posts of the other users may include one or more of swear words, derogatory terms, verbal attacks on a team or individual to which the topic of the channel corresponds along with profanity, excessive attacks on a team or individual to which the topic of the channel corresponds, excessive repetition of the same or similar statements, or other undesired characteristics.

Desired characteristics may correspond to characteristics of the actions of the other users that system administrators (or users) have identified as being desired (e.g., via reporting or other monitoring effects). In one scenario, desired characteristics of the posts of the other users may include absence of profanity, thoughtful analysis, praise for a team or individual to which the topic of the channel corresponds, or other desired characteristics.

In some implementations, the determination of the rating value based on the first model and the second model may comprise determining the rating value based on a comparison of the second model with the first model. For example, the second behavioral information may be processed to determine information indicative of characteristics of the actions of a user submitting a post. In one use case, where the first behavior information includes information indicative of undesired characteristics for the channel, the action characteristics of the user may be compared with the undesired characteristics to determine whether and/or how many of the action characteristics of the user correspond to the undesired characteristics. The rating value associated with the user may then be determined based on whether and/or how many of the action characteristics of the user correspond to the undesired characteristics (e.g., a higher number of corresponding undesired characteristics may result in a rating value indicative of a lower rating).

In another use case, where the first behavioral information includes information indicative of desired characteristics for the channel, the action characteristics of the user may alternatively or additionally be compared with the desired characteristics to determine whether and/or how many of the action characteristics of the user correspond to the desired characteristics. The rating value associated with the user may then be determined based on whether and/or how many of the action characteristics of the user correspond to the desired characteristics (e.g., a higher number of corresponding desired characteristics may result in a rating value indicative of a higher rating).

Distribution via Corresponding Channel Instances on Different Device Components

In various implementations, distribution subsystem 106 may be programmed to provide, on different device components, channel instances corresponding to a channel that is directed to a topic. The different device components may include a first device component, a second device component, or other device component. In one implementation, the first device component may include one or more first partitions. The second device component may include one or more second partitions. In another implementation, the first device component may include one or more first virtual machines. The second device component may include one or more second virtual machines.

In some implementations, distribution subsystem 106 may be programmed to receive a post from a user for submission to the channel. User profile subsystem 110 may be programmed to determine a rating value associated with the user submitting the post. Distribution subsystem 106 may be programmed to determine at least one channel instance of the channel instances on which to make the post available based on the rating value. Distribution subsystem 106 may then provide the post to one or more users associated with the at least one channel instance. In this way, among other benefits, the channel instances on the different device component allow for efficient handling of large quantities of posts or other content by appropriately sharing or separating the posts among one or more of the device components. Higher quality posts (e.g., determined based on rating values of users submitting the posts) may, for example, be placed on a higher number of the channel instances to increase the potential viewership of the higher quality posts. On the other hand, in some scenarios, lower quality posts (e.g., determined based on rating values of users submitting the posts) may be placed on a lower number of the channel instances to decrease the potential viewership of the lower quality posts, as well as reduce the amount of resources necessary to handle the lower quality posts.

Figure 4:
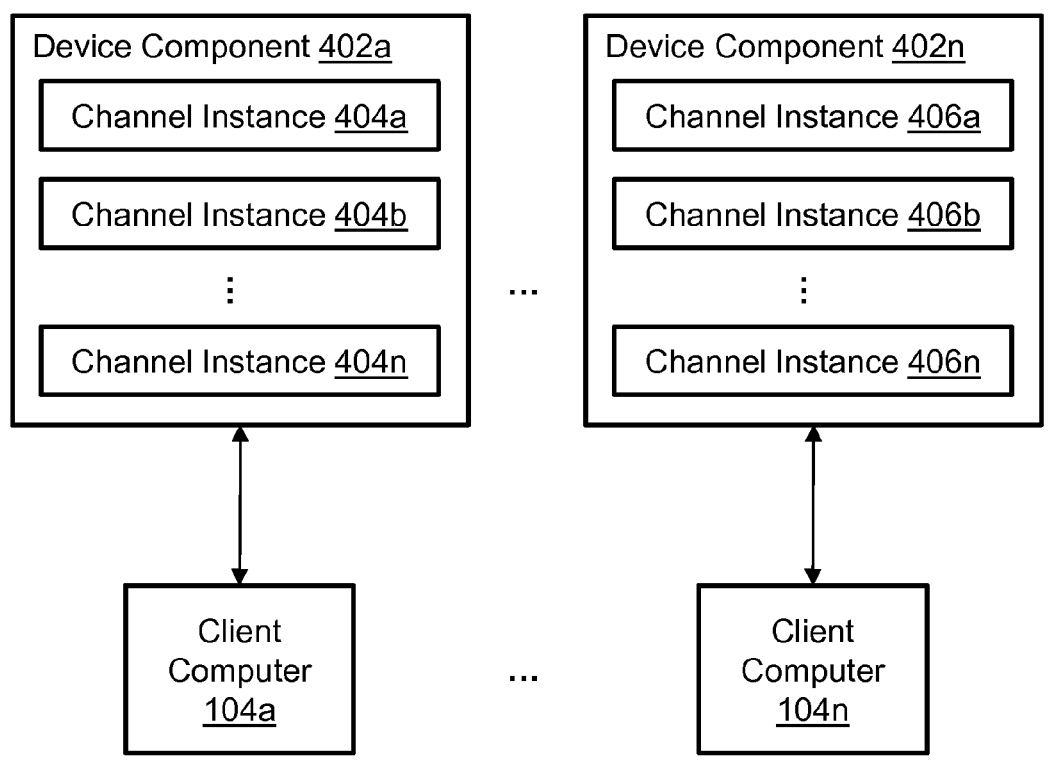
FIG. 4 is an exemplary illustration of different device components on which corresponding channel instances reside, according to an aspect of the invention.

By way of example, with respect to FIG. 4, channel instances may be hosted or managed on different device components 402a-402n. In one implementation, each of the device components 402a-402n may be an individual shard on which one or more channel instances are hosted or managed. As shown by FIG. 4, channel instances 404a-404n may be hosted or managed on device component 402a, and channel instances 406a-406n may be hosted or managed on device component 402n. Channel instances 404a and 406a may correspond to a first channel, channel instances 404b and 406b may correspond to a second channel, and so on. In one use case, one or more first users (e.g., a user of client computer 104a) may be designated to device component 402a, and one or more second users (e.g., a user of client computer 104n) may be designated to device component 402n. Posts placed on channel instance 404a may be provided to the first users accessing the channel to which channel instances 404a and 406a correspond. Posts placed on channel instance 406a may be provided to the second users accessing the channel to which channel instances 404a and 406a correspond.

In some implementations, a post received from a user for submission to a channel may not be provided to other users that are not associated with a channel instance of the channel instances on which the post is made available. In one scenario, with respect to FIG. 4, posts that are placed on channel instance 404a may be provided to the first users accessing the channel to which channel instances 404a and 406a correspond. However, if those posts are not placed on channel instance 406a, those posts may not be provided to the second users accessing the channel to which channel instances 404a and 406a correspond.

In various implementations, traffic subsystem 108 may be programmed to determine a stream flow value for a channel. The stream flow value may be based on a volume of posts associated with the channel.

In some implementations, distribution subsystem 106 may be programmed to determine at least one channel instance (corresponding to a channel) on which to make a post available by determining a quantity of channel instances on which to make the post available based on the stream flow value of the channel, the rating value of the user submitting the post, or other criteria.

In one exemplary and non-limiting use case, where a total number of channel instances corresponding to the channel is 16, the default number of channel instances on which to make a post available may be 5. The quantity of the channel instances on which a post is to be made available may be decreased by 1 from the default number for every 2 points that the stream flow value is above 5 points (e.g., a maximum stream flow value of 9 may cause the quantity of the channel instances to decrease from 5 to 3). The quantity of the channel instances may be increased by 1 from the default number for every 2 points that the stream flow value is below 5 points (e.g., a stream flow value of 1 may cause the quantity of the channel instances to increase from 5 to 7). In some use cases, other approaches to decreasing and increasing the quantity of the channel instances based on the stream flow value may be utilized.

In another exemplary and non-limiting use case, the quantity of the channel instances on which a post is to be made available may be increased by 1 for every 2 points that the rating value of the user submitting the post is above 5 points (e.g., a stream flow value of 1 may cause the quantity of the channel instances to increase from 5 to 7, a rating value of 9 may cause the quantity of the channel instances to further increase from 7 to 9, etc.). The quantity of the channel instances may be decreased by 1 for every 2 points that the rating value of the user submitting the post is below 5 points (e.g., a maximum stream flow value of 9 may cause the quantity of the channel instances to decrease from 5 to 3, a rating value of 1 may cause the quantity of the channel instances to further decrease from 3 to 1, etc.). In some use cases, other approaches to decreasing and increasing the quantity of the channel instances based on the rating value may be utilized. It should be appreciated that the foregoing values, ranges, etc., are exemplary in nature, and should not be viewed as limiting.

In certain implementations, distribution subsystem 106 may be programmed to determine at least one channel instance (corresponding to a channel) on which to make a post available by: (i) determining a first set of channel instances on which to make the post available in response to a rating value of a user submitting the post being a first rating value or a stream flow value of the channel being a first stream flow value; and (ii) determining a second set of channel instances on which to make the post available in response to the rating value being a second rating value different than the first rating value or the stream flow value being a second stream flow value different than the first stream flow value. The second set may be different than the first set.

In some implementations, the first set may include a greater number of the channel instances than the second set. The first rating value may be greater than the second rating value. The first stream flow value may be less than the second flow value.

By way of example, upon a determination that a post is to be made available on N number of the channel instances, distribution subsystem 106 may select the channel instances on which to make the post available such that the selected channel instances include the channel instance associated with the user submitting the post along with N−1 other ones of the channel instances. As indicated, the number N may be greater when the stream flow value is high or the rating value is high (e.g., as opposed to when the stream flow value is low or the rating value is low). In one scenario, the N−1 other channel instances may be selected randomly. In another scenario, the N−1 other channel instances may be selected based on a determination that the N−1 other channel instances are the most recent N−1 channel instances on which other posts of the user has been made available.

In certain implementations, distribution subsystem 106 may be programmed to determine at least one channel instance (corresponding to a channel) on which to make a post available by: (i) processing a stream flow value of the channel and a rating value of a user submitting the post to generate a distribution value; (ii) determining a first set of channel instances on which to make the post available in response to the distribution value being a first distribution value; and (iii) determining a second set of channel instances on which to make the post available in response to the distribution value being a second distribution value different than the first distribution value. For example, with respect to the above scenarios, the distribution value may be the number N (e.g., the N number of the channel instances) or other value used to determine on which and/or how many of the channel instances the post is to be made available.

Selective Presentation of Posts

According to an aspect of the invention, optimizing the quantity and quality of social media (or other) posts presented to users may be facilitated by selectively presenting up to a predetermined number of posts during a given time interval. By way of example, distribution subsystem 106 may be programmed to receive posts from one or more users for submission to a channel directed to a topic. Presentation subsystem 112 may be programmed to determine a predetermined number of the posts to make available during a given time interval to a first user accessing the channel. In some implementations, the predetermined number may be determined based on a stream flow value of the channel. For example, the predetermined number may be adjusted as the volume of posts that the channel is currently experience (or predicted to experience) changes. In one use case, the predetermined number may be 30 posts per minute when the number of posts per minute for the channel is less than 1000. However, when the number of posts per minute for the channel is between 1001 and 5000 posts, the predetermined number may be increased slightly up to 35 posts per minute to emphasize the increase in traffic or popularity of the channel to the first user.

At least one post of the posts to make available to the first user during the given time interval may be determined based on, for example, a user relationship between the first user and a user associated with the at least one post. As used herein, a user relationship (of one user with another user) may refer to one or more definitions of how the user knows, knows of, or is connected to the other user. In one use case, a first user may have a user relationship with a second user based on the first user being a "friend," "co-worker," "family relative," etc., of the second user. In another use case, a first user may have a user relationship with a second user based on the first user "following" the social media posts of the second user, the first user being a "fan" of the second user, etc. The user relationships may be user-defined or automatically defined for the users.

Presentation subsystem 112 may be programmed to determine at least another post of the posts to make available to the first user during the given time interval without regard to user relationships of the first user. Presentation subsystem 112 may be programmed to provide the at least one post and the at least another post to the first user such that a total number of the posts presented to the first user during the given time interval does not exceed the predetermined number. In this way, among other benefits, a user may be provided posts from users with which the user has user relationships, as well as posts from users with which the user may not have user relationships, without being inundated with excessive posts. The user may thus be provided with a higher likelihood for a diverse set of posts that the user may more easily view, interact with, or respond to, as compared with typical approaches to presentation of social media posts.

By way of example, with respect to FIG. 2, user interface 200 may depict at least some posts submitted to the Houston Rockets channel (e.g., directed to the Houston Rockets basketball team) that are presented to the first user during a given time interval. In one scenario, a first portion of a predetermined number of posts to be made available during the given time interval to the first user may be allocated for posts submitted by users with which the first user has a user relationship. A second portion of the predetermined number of posts may be allocated for posts that are determined for presentation to the user without regard to user relationships of the first user. As an example, the first portion of the predetermined number of posts may include posts submitted by Adam Johnson, a "friend" of the first user, or other users having a user relationship with the first user. The second portion of the predetermined number of posts may include posts submitted by users that may not have user relationships with the first user, such as Honest Sally, Bobby Joe, Tom Bower, or other users.

In some implementations, the determination to make the at least another post available to the first user may be based on a rating value associated with a second user from which the at least another post is received. In one use case, with respect to FIG. 2, Tom Bower may not have a user relationship with the first user. Nevertheless, posts submitted by Tom Bower may be selected to be made available to the first user based on Tom Bower's rating value being higher than other users that submitted posts to the channel. Tom Bower's rating value may, for example, be based on Tom Bower's posts and contributions to other channels (e.g., the San Antonio Spurs channel that is directed to the San Antonio Spurs basketball team or other channels). As shown, Tom Bower's recent posts to the Houston Rockets channel may be deemed to include undesired characteristics (e.g., nonsense rants, excessive attacks on the Houston Rockets team, or other undesired characteristics) for the Houston Rockets channel. As a result, Tom Bower's rating value may be decreased over time such that Tom Bower's future posts may not be selected to be made available to the first user when the Houston Rockets channel is experiencing a high volume of posts.

In various implementations, user profile subsystem 110 may be programmed to determine completeness information associated with a second user from which the at least another post is received. The completeness information may identify one or more profile-related requests for information that are completed by the second user. Profile-related requests may, for example, comprise a request for a profile picture of a user, contact information of the user, entity affinities of the user, interests of the user, a list of user contacts of the user, access privileges to other social media accounts of the user, or other requests. User profile subsystem 110 may be programmed to determine other completeness information associated with other users from which other ones of the posts are received. The other completeness information may identify one or more profile-related requests for information that are completed by the other users. In some implementations, the determination to make the at least another post available to the first user may be based the completeness information and the other completeness information.

In one scenario, with respect to FIG. 2, Honest Sally, Bobby Joe, and Tom Bower may not have a user relationship with the first user. Nevertheless, posts submitted by Honest Sally, Bobby Joe, and Tom Bower may be selected to be made available to the first user based on these users having a profile picture (e.g., "User Image") while other users submitting posts to the Houston Rockets channel do not.

In another scenario, posts submitted by Honest Sally, Bobby Joe, and Tom Bower may be selected to be made available to the first user based on these users allowing a social media platform that hosts or manages the Houston Rockets channel to access their contacts or other information from another social media platform for which Honest Sally, Bobby Joe, and Tom Bower are also users. The grant of permission by Honest Sally, Bobby Joe, and Tom Bower to access their contacts or other information may, for example, provide further confirmation that these users are real people. As such, posts submitted to the channel by Honest Sally, Bobby Joe, and Tom Bower may be given higher priority for being selected for presentation to the first user than posts submitted to the channel by other users that do not provide the social media platform with access to their contacts or other information from another social media platform.

In some implementations, selection of a post from among a plurality of posts for presentation to a first user accessing a channel may be based on user affinities of users submitting the posts. As an example, a post may be selected based on a determination that a user submitting the post to a channel has a greater affinity to a channel topic (to which the channel is directed) than other users that submitted other posts to the channel.

As an example, the topic (to which the channel is directed) may correspond to a sports team. In one use case, with respect to FIG. 2, Bobby Joe may not have a user relationship with the first user, and Bobby Joe's rating value may not be as high as some of the other users whose submitted posts were not selected to be made available on the Houston Rockets channel. Nonetheless, posts submitted by Bobby Joe may be selected based on Bobby Joe designating himself as a fan of the Houston Rockets on the social media platform hosting the Houston Rockets channel. As an example, Bobby Joe's rating value may only be slightly lower than other users that are designated fans of other teams. As such, Bobby Joe's affinity with the Houston Rockets may be a factor upon which the selection of his posts for presentation to the first user is based.

In another implementation, the topic may correspond to an individual, and a determination to make a post available to a first user may based on a determination that a second user submitting the post to a channel has a greater affinity to the individual than other users that submitted other posts to the channel. By way of example, the channel may be directed to an individual player of a sport in which there are generally no established teams (e.g., golf, or another "individual" sport). The determination to make the second user's posts available to the first user may be based on the second user being a fan of the individual.

In some implementations, for users with whom a first user has a user relationship, the determination to make those user's posts available to the first user may further be based on rating values, completeness information, affinity information, or other criteria. For example, with respect to FIG. 2, posts submitted by Adam Johnson may be presented to the user in lieu of other posts submitted by other users with which the first user has a user relationship based on: (i) the rating value associated with Adam Johnson being higher than the rating values associated with the other users; (ii) Adam Johnson having a profile picture while the other users do not have profile pictures; or (iii) Adam Johnson being a fan of the Houston Rockets while the other users may be fans of other teams.

Selective User Moderation of Channels

In certain implementations, distribution subsystem 106 may be programmed to receive one or more posts from a user for submission to a channel directed to a topic. User moderation subsystem 114 may be programmed to identify an event relating to the topic. User moderation subsystem 114 may be programmed to identify a predetermined time period associated with the event. The predetermined time period may, for example, include a first time period before the event begins, a second time period during which the event occurs, a third time period after which the event ends, or other time period associated with the event. User moderation subsystem 114 may be programmed to disable at least some access privileges of the user for the channel for the predetermined time period and/or for some other amount of time that may not necessarily be associated with the event.

The disabling of the at least some access privileges may be based on a determination that the one or more posts are indicative of one or more undesired characteristics. In this way, among other benefits, users with negative incidents isolated to one or more channels or circumstances may not necessarily be outright banned from the social media platform.

As an example, with respect to FIG. 2, an event may be a basketball game between the Houston Rockets and the San Antonio Spurs. Tom Bower's posts may have been submitted during a pre-game time period of the Rockets vs. Spurs game. If, for example, Tom Bower's posts are determined to include undesired characteristics, at least some of Tom Bower's access privileges for the channel or the social media platform itself may be disabled. In one scenario, access privileges may include the ability to submit new posts to the channel, the ability to comment on posts that are presented on the channel, the ability to view posts that are presented on the channel, or other access privileges. One or more of these privileges, such as Tom Bower's ability to submit new posts, may be disabled for the remainder of the pre-game time period, a game time period, and/or a post-game time period associated with the game based on the determination that his posts shown in FIG. 2 include one or more undesired characteristics.

In various implementations, one or more posts may be received before the predetermined time period. In some implementations, at least some access privileges of a user may be configured before the predetermined time period to be disabled for the predetermined time period. In one use case, posts that are submitted before the predetermined time period may be monitored and analyzed to determine users that will likely submit posts with undesired characteristics (e.g., abusive posts, nonsense posts, or other posts with undesired characteristics) to the channel during the predetermined time period. As such, users that are determined to be likely to submit posts with undesired characteristics to the channel during the predetermined time period may have their posting privileges configured before the predetermined time period to be disabled during the predetermined time period, thereby preventing those users from exhibiting the undesired characteristics during the predetermined time period.

In some implementations, user moderation subsystem 114 may be programmed to receive reporting information. The reporting information may relate to one or more actions of one or more other users. The actions may indicate a negative experience of the one or more other users with one or more posts of a user. The one or more posts may be determined to be indicative of one or more undesired characteristics based on the reporting information.

In one implementation, the one or more actions may include a request for administrative or system review of the one or more posts. In one scenario, users that believe a post violates one or more policies of the channel may explicitly report the post by activating a "report" link embedded within the post. The activation of the report link may cause the request for administrative review of the post. A determination that the reported post includes one or more undesired characteristics may be based on the administrative review.

In another implementation, the one or more actions may include a request to mute posts from the user such that posts from the user are no longer presented for at least some other users. As an example, users that no longer wish to see posts from the user may activate an option available for the channel to mute posts from the user. While posts submitted by the user may not necessarily violate policies of the channel, a high number of users that mute posts from the user may indicate that the posts include one or more undesired characteristics. Muting may be for a limited time or permanently.

In some implementations, user moderation subsystem 114 may be programmed to determine whether a quantity of the one or more actions meets or exceeds a predetermined threshold for disabling access. The disabling of at least some access privileges of a user may further be based on a determination that the quantity meets or exceeds the predetermined threshold. In one use case, a high number of requests for administrative review of one or more posts of a user that exceeds the predetermined threshold may trigger at least some access privileges of the user for the channel to be disabled for the predetermined time period.

In certain implementations, the disabling of at least some access privileges of a user may comprise limiting distribution of subsequent posts of the user via the channel for a predetermined period. Limiting of the distribution may, for example, comprise limiting a distribution rate of subsequent posts of the user via the channel for the predetermined period while allowing at least some subsequent posts of the user to be distributed via the channel for the predetermined period. By way of example, the user may have had the ability to submit an unlimited number of posts before the at least some access privileges were disabled such that those submitted posts are placed on the channel for presentation to other users. After the access privileges are disabled, the user's post submissions may be limited to a rate of a single post per half hour (or other time interval) such that posts submitted during the predetermined time period that exceed the limited rate will not be placed on the channel for presentation to the other users.

In another implementation, limiting distribution may comprise preventing distribution of subsequent posts by the user via the channel for the predetermined period such that no subsequent posts by the user are distributed via the channel for the predetermined period after the limiting of the distribution.

In some implementations, the disabling of at least some access privileges of a user may be based on a stream flow value of a channel. For example, the stream flow value may be based on a prediction that the channel will experience a high volume of posts during the predetermined time period. In response to the stream flow value indicating a high volume of posts during the predetermined period, user moderation subsystem 114 may be more likely to disable at least some access privileges of the user for the channel during the predetermined time period. For example, user moderation subsystem 114 may apply a first set of policies when the stream flow value indicates a low volume of posts. On the other hand, user moderation subsystem 114 may apply a second set of policies that are stricter than the first set of policies when the stream flow value indicates a high volume of posts. The application of the stricter second set of policies may, for example, result in a higher number of users that have at least some of their access rights disabled for the predetermined time period.

In some implementations, a rating value of a user may be taken into account when determining the scope of the access privileges to be disabled for the user. In one implementation, access privileges of the user for a channel may not be disabled for time periods other than the predetermined time period based on the rating value. By way of example, users associated with low rating values may have their posting privileges for the channel disabled indefinitely or for a time period greater than the predetermined time period associated with the event. As discussed, a low rating value may indicate a low rating of the user. A low rating may, for example, be based on indications that the user's contribution to the channel or other channels may not be trusted by system administrators or other users to provide quality posts, the current or previous experience of other users with the user's posts may have been negative, the user or the user's posts may be have reported for exhibiting abusive or nonsense behavior, the user or the user's posts may have been muted by other users, etc. Thus, it may not be advantageous to allow users associated with low rating values to continue to provide posts to the channel when the majority of their posts for the channel may likely include undesired characteristics regardless of the current time period.

On the other hand, as another example, users associated with high rating values may have their posting privileges for the channel disabled only during the predetermined time period. As mentioned, a high rating value may indicate a high rating of the user. A high rating may, for example, be based on indications that the user's contribution to the channel or other channels may be highly regarded by system administrators or other users, the user may be trusted by system administrators or other users to provide quality posts, the current or previous experience of other users with the user's posts may have been largely positive, etc. As such, it may be advantageous to allow users associated with high rating values to continue to provide posts on the channel, for example, when their undesired actions may be isolated to circumstances surrounding the event to which the predetermined time period is related.

Exemplary Flowcharts

Figure 5:
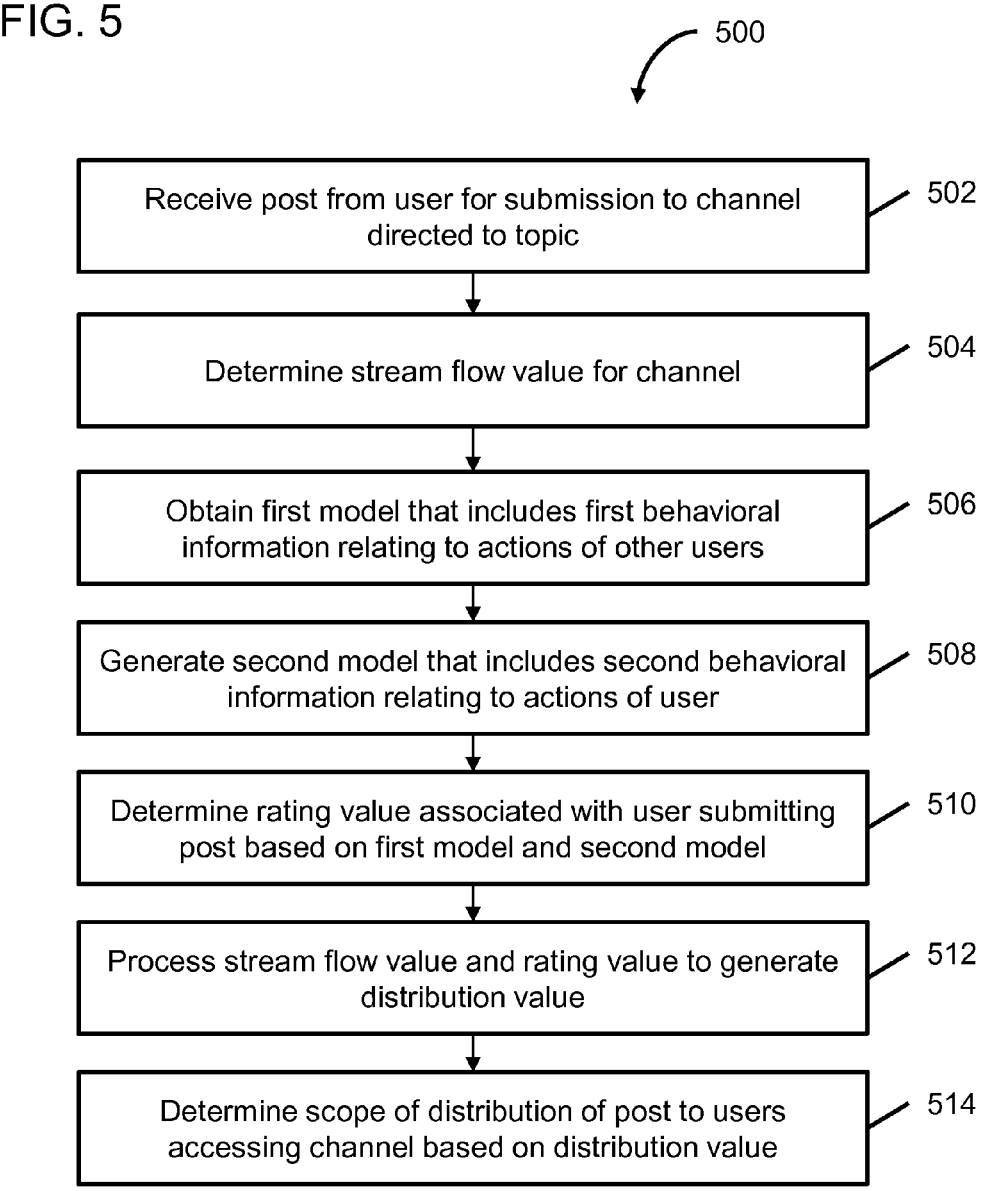
FIG. 5 is an exemplary illustration of a flowchart of a method of facilitating distribution of social media posts to users, according to an aspect of the invention.

FIG. 5 is an exemplary illustration of a flowchart of a method 500 of facilitating distribution of social media posts to users, according to an aspect of the invention. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 (and described below) is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In an operation 502, a post may be received from a user for submission to a channel directed to a topic. The post may include one or more of text, images, videos, haptic effects, or other content. Operation 502 may be performed by a distribution subsystem that is the same as or similar to distribution subsystem 106, in accordance with one or more implementations.

In an operation 504, a stream flow value may be determined for the channel. The stream flow value may be based on a volume of posts associated with the channel. Operation 504 may be performed by a traffic subsystem that is the same as or similar to traffic subsystem 108, in accordance with one or more implementations.

In an operation 506, a first model may be obtained. The first model may include first behavioral information relating to actions of one or more other users (or other information). The actions of one or more other users may include one or more of posts submitted by the other users or other actions by the other users. In one implementation, the first behavioral information may relate to one or more posts submitted by the other users for the channel. In another implementation, the first behavioral information may relate to a plurality of posts submitted by the other users for a plurality of channels directed to different topics. Operation 506 may be performed by a user profile subsystem that is the same as or similar to user profile subsystem 110, in accordance with one or more implementations.

In an operation 508, a second model may be generated. The second model may include second behavioral information relating to actions of the user submitting the post. In one implementation, the second behavioral information may relate to one or more posts submitted by the user for the channel. In another implementation, the second behavioral information may relate to a plurality of posts submitted by the users for a plurality of channels directed to different topics. Operation 508 may be performed by a user profile subsystem that is the same as or similar to user profile subsystem 110, in accordance with one or more implementations.

In an operation 510, a rating value associated with the user submitting the post may be determined based on the first model and the second model. In some implementation, the rating value associated with the user may be determined based on a comparison of the second model with the first model. Operation 510 may be performed by a user profile subsystem that is the same as or similar to user profile subsystem 110, in accordance with one or more implementations.

In one implementation, with respect to operations 506, 508, or 510, the first behavioral information may include information indicative of undesired characteristics, desired characteristics, or other characteristics. The undesired characteristics may, for example, correspond to characteristics of the actions of the other users that system administrators or users have identified as being undesired. The desired characteristics may correspond to characteristics of the actions of the other users that system administrators or users have identified as being desired. The second behavioral information may be processed to determine information indicative of characteristics of the actions of the user. The action characteristics of the user may then be compared with the undesired characteristics to determine whether and/or how many of the action characteristics of the user correspond to the undesired characteristics. The action characteristics of the user may alternatively or additionally be compared with the desired characteristics to determine whether and/or how many of the action characteristics of the user correspond to the desired characteristics. The rating value associated with the user may be determined based on whether and/or how many of the action characteristics of the user correspond to the undesired characteristics (e.g., a higher number of corresponding characteristics may result in a rating value indicative of a lower rating). The rating value associated with the user may alternatively or additionally be determined based on whether and/or how many of the action characteristics of the user correspond to the desired characteristics (e.g., a higher number of corresponding characteristics may result in a rating value indicative of a higher rating).

In an operation 512, the stream flow value of the channel and the rating value associated with the user may be processed to generate a distribution value. Operation 512 may be performed by a distribution subsystem that is the same as or similar to distribution subsystem 106, in accordance with one or more implementations.

In an operation 514, a scope of distribution of the post to users accessing the channel may be determined based on the distribution value. Operation 514 may be performed by a distribution subsystem that is the same as or similar to distribution subsystem 106, in accordance with one or more implementations.

In certain implementations, with respect to operation 514, the channel to which the post is submitted may correspond to channel instances on different device components. In one implementation, the determination of the scope of the distribution of the post may comprise determining a quantity of the channel instances on which to make the post available based on the distribution value. In another implementation, a first set of the channel instances on which to make the post available may be determined in response to the distribution value being a first distribution value. A second set of the channel instances on which to make the post available may be determined in response to the distribution value being a second distribution value different than the first distribution value. The second set of the channel instances may be different than the first set of the channel instances.

In some implementations, the different device components may include a first device component, a second device component, or other device component. In one implementation, the first device component may include one or more first partitions. The second device component may include one or more second partitions. In another implementation, the first device component may include one or more first virtual machines. The second device component may include one or more second virtual machines.

Figure 6:
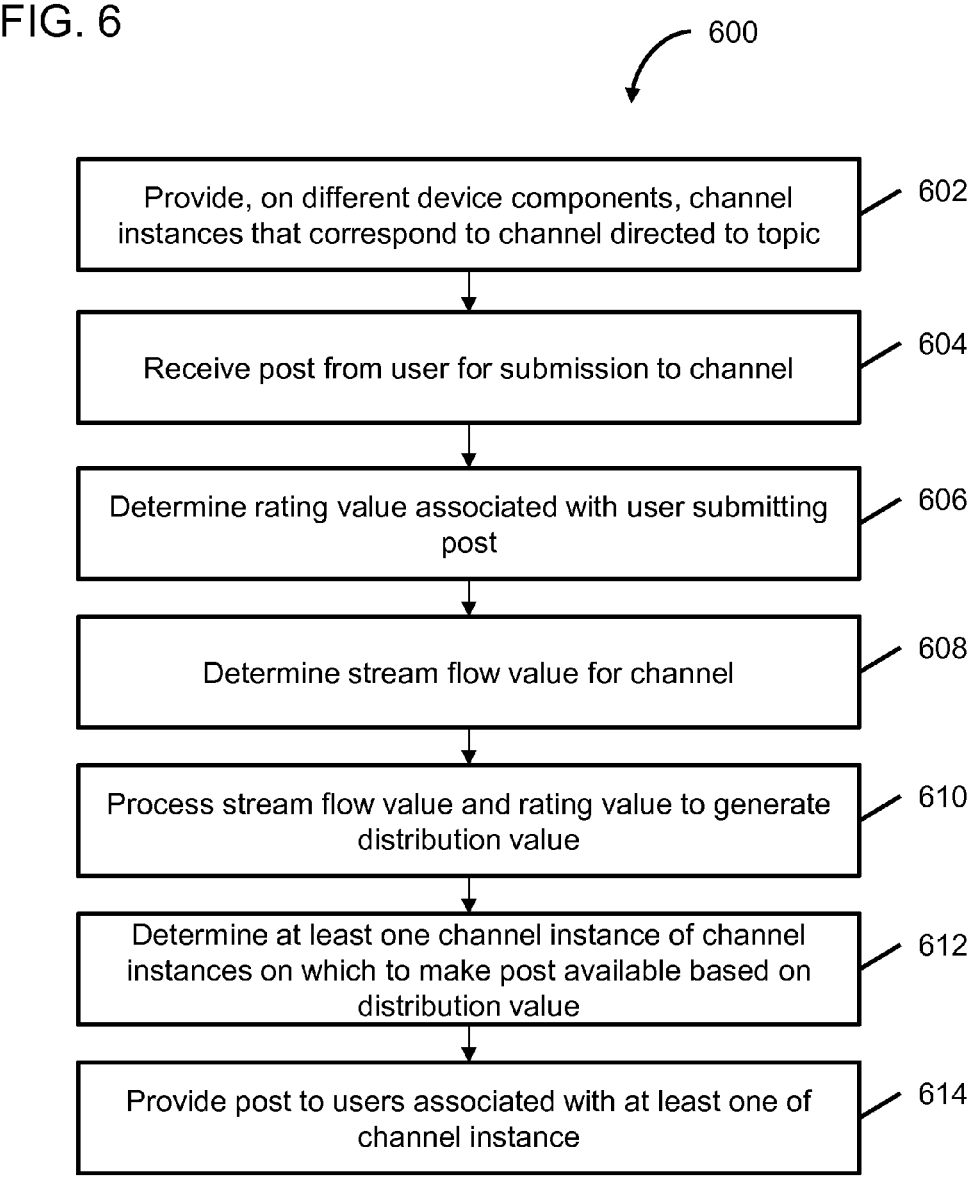
FIG. 6 is an exemplary illustration of a flowchart of a method of facilitating distribution of social media posts on channel instances on different device components, according to an aspect of the invention.

FIG. 6 is an exemplary illustration of a flowchart of a method of facilitating distribution of social media posts on channel instances on different device components, according to an aspect of the invention. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 (and described below) is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

In an operation 602, channel instances that correspond to a channel directed to a topic may be provided on different device components. In some implementations, the different device components may include a first device component, a second device component, or other device component. In one implementation, the first device component may include one or more first partitions. The second device component may include one or more second partitions. In another implementation, the first device component may include one or more first virtual machines. The second device component may include one or more second virtual machines. Operation 602 may be performed by a distribution subsystem that is the same as or similar to distribution subsystem 106, in accordance with one or more implementations.

In an operation 604, a post from a user may be received for submission to the channel. The post may include one or more of text, images, videos, haptic effects, or other content. Operation 604 may be performed by a distribution subsystem that is the same as or similar to distribution subsystem 106, in accordance with one or more implementations.

In an operation 606, a rating value associated with the user submitting the post may be determined. Operation 606 may be performed by a distribution subsystem that is the same as or similar to user profile subsystem 110, in accordance with one or more implementations.

In an operation 608, a stream flow value may be determined for the channel. The stream flow value may indicate a volume of posts associated with the channel. Operation 608 may be performed by a traffic subsystem that is the same as or similar to traffic subsystem 108, in accordance with one or more implementations.

In an operation 610, the stream flow value of the channel and the rating value associated with the user may be processed to generate a distribution value. Operation 610 may be performed by a distribution subsystem that is the same as or similar to distribution subsystem 106, in accordance with one or more implementations.

In an operation 612, at least one channel instance of the channel instances on which to make the post available may be determined based on the distribution value. In one implementation, the determination of the at least one channel instance may comprise determining a quantity of the channel instances on which to make the post available based on the distribution value. In another implementation, the determination of the at least one channel instance may comprise: (i) determining a first set of the channel instances on which to make the post available in response to the distribution value being a first distribution value; and (ii) determining a second set of the channel instances on which to make the post available in response to the distribution value being a second distribution value different than the first distribution value. The second set of the channel instances may be different than the first set of the channel instances. Operation 612 may be performed by a distribution subsystem that is the same as or similar to distribution subsystem 106, in accordance with one or more implementations.

In an operation 614, the post may be provided to one or more users associated with the at least one channel instance. Operation 614 may be performed by a distribution subsystem that is the same as or similar to distribution subsystem 106, in accordance with one or more implementations.

Figure 7:
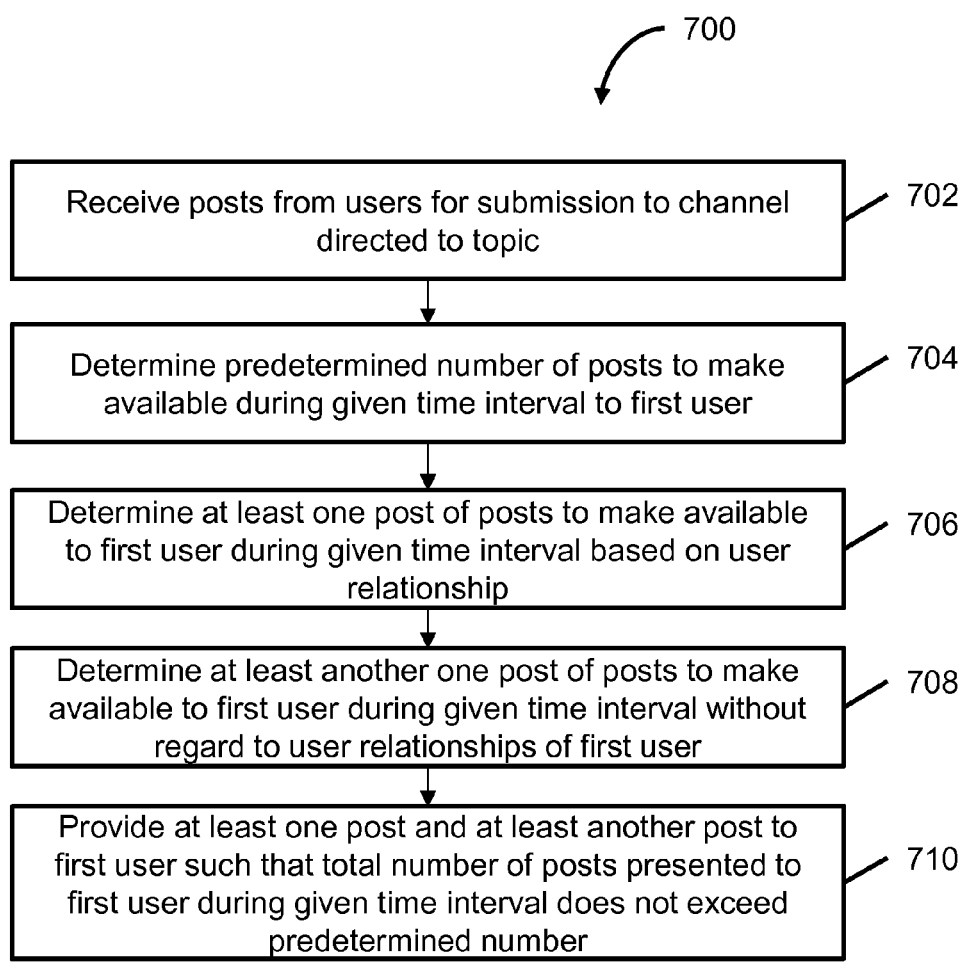
FIG. 7 is an exemplary illustration of a flowchart of a method of optimizing quantity and quality of social media posts presented to users, according to an aspect of the invention.

FIG. 7 is an exemplary illustration of a flowchart of a method of optimizing quantity and quality of social media posts presented to users, according to an aspect of the invention. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 (and described below) is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In an operation 702, posts from one or more users may be received for submission to a channel directed to a topic. The posts may include one or more of text, images, videos, haptic effects, or other content. Operation 702 may be performed by a distribution subsystem that is the same as or similar to distribution subsystem 106, in accordance with one or more implementations.

In an operation 704, a predetermined number of the posts to make available during a given time interval to a first user accessing the channel may be determined. Operation 704 may be performed by a presentation subsystem that is the same as or similar to presentation subsystem 112, in accordance with one or more implementations.

In an operation 706, at least one post of the posts to make available to the first user during the given time interval may be determined based on one or more user relationships of the first user. For example, the at least one post may be made available to the first user during the given time interval based on a user relationship of the first user with a user associated with the at least one post. Operation 706 may be performed by a presentation subsystem that is the same as or similar to presentation subsystem 112, in accordance with one or more implementations.

In an operation 708, at least another post of the posts to make available to the first user during the given time interval may be determined without regard to user relationships of the first user. In certain implementations, the determination to make the at least another post available to the first user may be based on a rating value associated with a second user from which the at least another post is received. In some implementations, the at least one user is received from a user that does not have a user relationship with the first user (e.g., the second user or other user). Operation 708 may be performed by a presentation subsystem that is the same as or similar to presentation subsystem 112, in accordance with one or more implementations.

In an operation 710, the at least one post and the at least another post may be provided to the first user such that a total number of the posts presented to the first user during the given time interval does not exceed the predetermined number. Operation 710 may be performed by a distribution subsystem that is the same as or similar to distribution subsystem 106, in accordance with one or more implementations.

Figure 8:
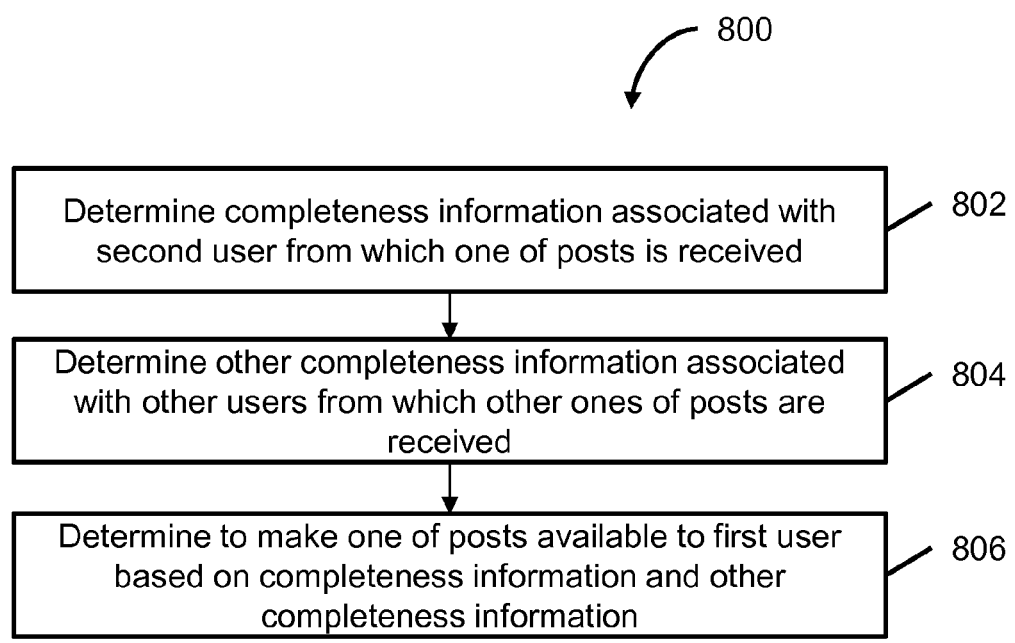
FIG. 8 is an exemplary illustration of a flowchart of a method of determining posts to make available to users based on profile-related requests for information that are completed by the users, according to an aspect of the invention.

FIG. 8 is an exemplary illustration of a flowchart of a method of determining posts to make available to users based on profile-related requests for information that are completed by the users, according to an aspect of the invention. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 (and described below) is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

In certain implementations, operation 708 of FIG. 7 (the determination of the at least another post to make available to the first user during the given time interval) may comprise one or more of operations 802, 804, 806, or other operations. In an operation 802, completeness information associated with a second user may be determined. The second user may be a user from which the at least another post is received. The completeness information may identify one or more profile-related requests for information that are completed by the second user. Operation 802 may be performed by a user profile subsystem that is the same as or similar to user profile subsystem 110, in accordance with one or more implementations.

In an operation 804, other completeness information associated with other users may be determined. The other users may be users from which other ones of the posts are received. The other completeness information may identify one or more profile-related requests for information that are completed by the other users. Operation 804 may be performed by a user profile subsystem that is the same as or similar to user profile subsystem 110, in accordance with one or more implementations.

In an operation 806, the at least another post may be determined to be made available to the first user based on the completeness information and the other completeness information. By way of example, the at least another post may made available to the first user in lieu of the other ones of the posts based on one or more profile-related requests for information (e.g., profile picture, address information, education information, or other information) being completed by the second user and based on at least one of the profile-related requests not being completed by the other users. Operation 806 may be performed by a presentation subsystem that is the same as or similar to presentation subsystem 112, in accordance with one or more implementations.

Figure 9:
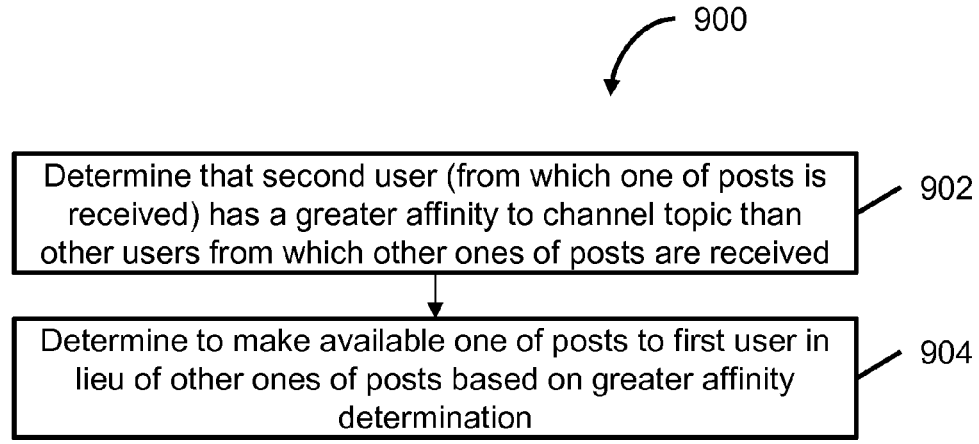
FIG. 9 is an exemplary illustration of a flowchart of a method of determining posts to make available to users based on user affinity to a channel topic, according to an aspect of the invention.

FIG. 9 is an exemplary illustration of a flowchart of a method of determining posts to make available to users based on user affinity to a channel topic, according to an aspect of the invention. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 (and described below) is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

In certain implementations, operation 708 of FIG. 7 (the determination of the at least another post to make available to the first user during the given time interval) may comprise one or more of operations 902, 904, or other operations. In an operation 902, a second user may be determined to have a greater affinity to a channel topic than other users. As indicated, posts that are received for submission to a channel directed to the topic may be received from the second user and the other users such that the at least another post is received from the second user and other ones of the posts are received from the other users. Operation 902 may be performed by a user profile subsystem that is the same as or similar to user profile subsystem 110, in accordance with one or more implementations.

In an operation 904, a determination to make available the at least another post to the first user in lieu of other ones of the posts may be effectuated. For example, the determination to make available the at least another post in lieu of the other ones of the posts may be based on a determination that the second user has a greater affinity to the topic than the other users from which the other ones of the posts are received. Operation 904 may be performed by a distribution subsystem that is the same as or similar to distribution subsystem 106, in accordance with one or more implementations.

Figure 10:
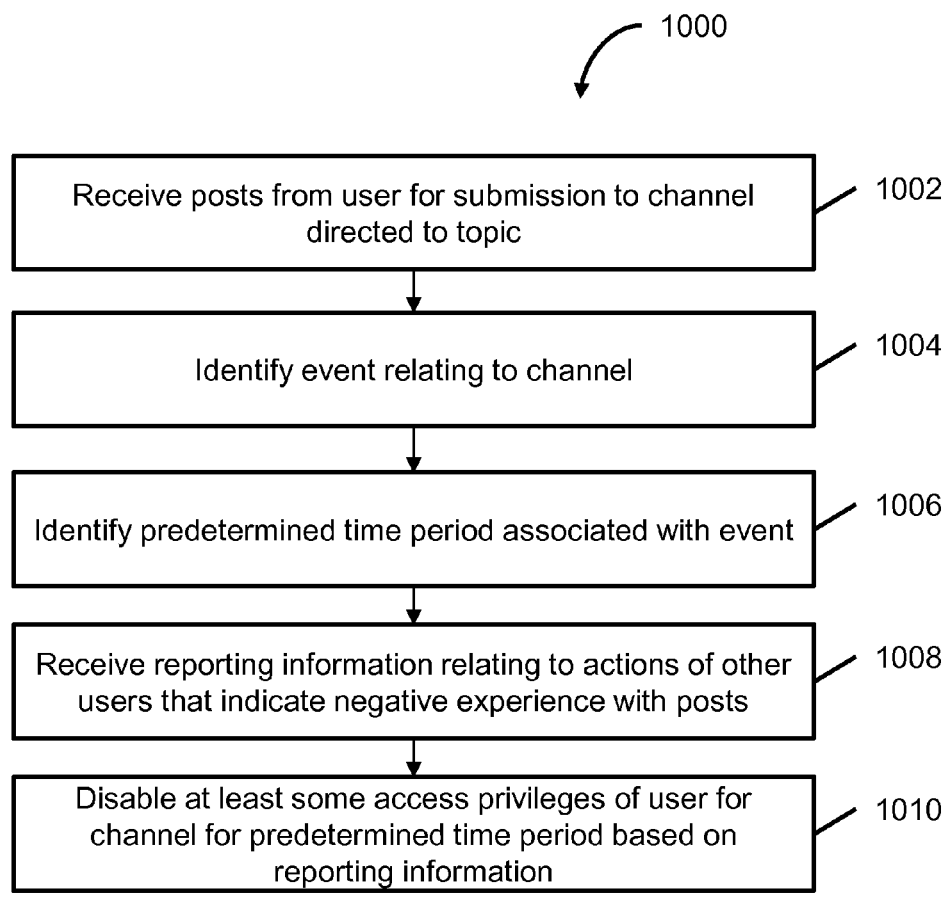
FIG. 10 is an exemplary illustration of a flowchart of a method of facilitating selective user moderation of social media channels, according to an aspect of the invention.

FIG. 10 is an exemplary illustration of a flowchart of a method of facilitating selective user moderation of social media channels, according to an aspect of the invention. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 (and described below) is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

In an operation 1002, one or more posts may be received from a user for submission to a channel directed to a topic. The one or more posts may include one or more of text, images, videos, haptic effects, or other content. Operation 1002 may be performed by a distribution subsystem that is the same as or similar to distribution subsystem 106, in accordance with one or more implementations.

In an operation 1004, an event relating to the topic may be identified. In one implementation, the event may be identified based on the one or more posts being received during a predetermined time period associated with the event. In another implementation, the event may be identified based on the event being the next or an upcoming chronological event in a list of events associated with the topic to which the channel is directed. In another implementation, the event may be identified based on the event being a highly viewed event, a high priority event, or other event satisfying one or more predetermined criteria. Operation 1004 may be performed by a user moderation subsystem that is the same as or similar to user moderation subsystem 114, in accordance with one or more implementations.

In an operation 1006, a predetermined time period associated with the event may be identified. The predetermined time period may include a first time period before the event begins, a second time period during which the event occurs, a third time period after which the event ends, or other time period associated with the event. Operation 1006 may be performed by a user moderation subsystem that is the same as or similar to user moderation subsystem 114, in accordance with one or more implementations.

In an operation 1008, reporting information relating to one or more actions of one or more other users may be received. The one or more actions may indicate a negative experience of the other users with the one or more posts. In one implementation, the one or more actions may include a request for administrative or system review of the one or more posts. In another implementation, the one or more actions may include a request to mute posts from the user such that posts from the user are no longer presented for at least some other users. Operation 1008 may be performed by a user moderation subsystem that is the same as or similar to user moderation subsystem 114, in accordance with one or more implementations.

In an operation 1010, at least some access privileges of the user to the channel may be disabled. For example, the at least some access privileges may be disabled based on the reporting information. In certain implementation, a determination of whether a quantity of the one or more actions indicated by the reporting information meets or exceeds a predetermined threshold for disabling access may be effectuated. The at least some access privileges may be disabled based on a determination that the quantity of the one or more actions meets or exceeds the predetermined threshold. In one implementation, the at least some access privileges may be configured before the predetermined time period to be disabled for the predetermined time period and/or for some other amount of time that may not necessarily be associated with the event. In another implementation, the at least some access privileges may be configured to be disabled for the predetermined time period after the predetermined time has already begun such that the at least some access privileges is configured to be disabled for a remaining time of the predetermined time period. Operation 1010 may be performed by a user moderation subsystem that is the same as or similar to user moderation subsystem 114, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

The invention claimed is:

1. A computer-implemented method of facilitating distribution of social media posts to users, the method being implemented by a computer system that includes one or more physical processors programmed with one or more computer program instructions which, when executed, perform the method, the method comprising:
   receiving, by the computer system, a post from a user for submission to a channel directed to a topic, wherein the channel corresponds to channel instances on different device components;
   determining, by the computer system, a stream flow value for the channel, wherein the stream flow value is based on a volume of posts associated with the channel;
   determining, by the computer system, a rating value associated with the user submitting the post;
   processing, by the computer system, the stream flow value and the rating value to generate a distribution value;
   determining, by the computer system, a set of the channel instances on which to make the post available, wherein the set of the channel instances comprises a first set of the channel instances responsive to the distribution value being a first distribution value, and wherein the set of the channel instances comprises a second set of the channel instances responsive to the distribution value being a second distribution value different than the first distribution value; and
   providing, by the computer system, the post to users associated with the set of the channel instances.

2. The method of claim 1, wherein providing the posts comprises streaming the post to users associated with the set of the channel instances.

3. The method of claim 1, further comprising:
   obtaining, by the computer system, a first model that includes first behavioral information relating to actions of one or more other users; and generating, by the computer system, a second model that includes second behavioral information relating to actions of the user, wherein determining the rating value comprises determining the rating value based on the first model and the second model.

4. The method of claim 3, wherein the actions of one or more other users include one or more posts.

5. The method of claim 4, wherein the one or more posts include a plurality of posts submitted for a plurality of channels.

6. The method of claim 3, wherein the actions of one or more other users include actions of a plurality of users.

7. The method of claim 3, wherein the first behavioral information includes information indicative of undesired characteristics for the channel.

8. The method of claim 3, wherein the first behavioral information includes information indicative of desired characteristics for the channel.

9. The method of claim 1, further comprising:

determining, by the computer system, a quantity of the channel instances on which to make the post available, wherein the quantity is a first quantity responsive to the distribution value being the first distribution value, wherein the quantity is a second quantity responsive to the distribution value being the second distribution value, and wherein the set of the channel instances is determined based on the quantity.

10. The method of claim 1, wherein the different device components include a first device component and a second device component, wherein the first device component includes one or more first partitions, and wherein the second device component includes one or more second partitions.

11. The method of claim 1, wherein the different device components include a first device component and a second device component, wherein the first device component includes one or more first virtual machines, and wherein the second device component includes one or more second virtual machines.

12. The method of claim 1, wherein the post includes one or more of text, images, videos, or haptic effects.

13. A computer-implemented method of facilitating distribution of social media posts to users, the method being implemented by a computer system that includes one or more physical processors programmed with one or more computer program instructions which, when executed, perform the method, the method comprising:

providing, by the computer system, channel instances on different device components, wherein the channel instances correspond to a channel that is directed to a topic;

receiving, by the computer system, a post from a user for submission to the channel;

determining, by the computer system, a rating value associated with the user submitting the post;

determining, by the computer system, a set of the channel instances on which to make the post available, wherein the set of the channel instances comprise a first set of the channel instances responsive to the rating value being a first rating value, and wherein the set of the channel instances comprises a second set of the channel instances responsive to the rating value being a second rating value different than the first rating value; and providing, by the computer system, the post to users associated with the set of the channel instances.

14. The method of claim 13, wherein the post is not provided to other users that are not associated with a channel instance of the channel instances on which the post is made available.

15. The method of claim 13, further comprising:

determining, by the computer system, a quantity of the channel instances on which to make the post available, wherein the quantity is a first quantity responsive to the rating value being the first rating value, wherein the quantity is a second quantity responsive to the rating value being the second rating value, and wherein the set of the channel instances is determined based on the quantity.

16. The method of claim 13, wherein the first set includes a greater number of the channel instances than the second set, and wherein the first rating value is greater than the second rating value.

17. The method of claim 13, further comprising:

determining, by the computer system, a stream flow value for the channel, wherein the stream flow value is based on a volume of posts associated with the channel, and wherein the set of the channel instances is determined further based on the stream flow value.

18. A computer-implemented method of optimizing the quality and quantity of social media posts presented to users, the method being implemented by a computer system that includes one or more physical processors programmed with one or more computer program instructions which, when executed, perform the method, the method comprising:

receiving, by the computer system, posts from one or more users for submission to a channel directed to a topic;

determining, by the computer system, a predetermined number of the posts to make available during a given time interval to a first user accessing the channel;

determining, by the computer system, at least one post of the posts to make available to the first user during the given time interval based on a user relationship between the first user and a user associated with the at least one post;

determining, by the computer system, at least another post of the posts to make available to the first user during the given time interval without regard to user relationships of the first user; and providing, by the computer system, the at least one post and the at least another post to the first user such that a total number of the posts presented to the first user during the given time interval does not exceed the predetermined number.

19. The method of claim 18, wherein the at least another post is received from a user that does not have a user relationship with the first user.

20. The method of claim 18, wherein the determination to make the at least another post available to the first user is based on a rating value associated with a second user from which the at least another post is received.

21. The method of claim 18, wherein the predetermined number is determined based on a stream flow value of the channel.

22. The method of claim 18, further comprising:

determining, by the computer system, completeness information associated with a second user from which the at least another post is received, wherein the completeness information identifies one or more profile-related requests for information that are completed by the second user; and determining, by the computer system, other completeness information associated with other users from which other ones of the posts are received, wherein the other completeness information identifies one or more profile-related requests for information that are completed by the other users, and wherein the determination to make the at least another post available to the first user is based the completeness information and the other completeness information.

23. The method of claim 18, wherein the at least another post is received from a second user, and wherein the determination to make the at least another post available to the first user comprises:

determining to make available the at least another post to the first user in lieu of other ones of the posts based on a determination that the second user has a greater affinity to the topic than other users from which the other ones of the posts are received.

24. The method of claim 23, wherein the topic corresponds to an individual, and wherein the determination to make the at least another post available to the first user is based on a determination that the second user has a greater affinity to the individual than the other users.

25. The method of claim 23, wherein the topic corresponds to a team, and wherein the determination to make the at least another post available to the first user is based on a determination that the second user has a greater affinity to the team than the other users.

26. A system for facilitating distribution of social media posts to users, the system comprising:

one or more physical processors programmed with one or more computer program instructions which, when executed, cause the one or more physical processors to:

receive a post from a user for submission to a channel directed to a topic, wherein the channel corresponds to channel instances on different device components;

determine a stream flow value for the channel, wherein the stream flow value is based a volume of posts associated with the channel;

determine a rating value associated with the user submitting the post;

process the stream flow value and the rating value to generate a distribution value;

determine a set of the channel instances on which to make the post available, wherein the set of the channel instances comprises a first set of the channel instances responsive to the distribution value being a first distribution value, and wherein the set of the channel instances comprises a second set of the channel instances responsive to the distribution value being a second distribution value different than the first distribution value; and provide the post to users associated with the set of the channel instances.

27. The system of claim 26, wherein providing the posts comprises streaming the post to users associated with the set of the channel instances.

28. The system of claim 26, wherein the one or more physical processors are further caused to:

determine a quantity of the channel instances on which to make the post available, wherein the quantity is a first quantity responsive to the distribution value being the first distribution value, wherein the quantity is a second quantity responsive to the distribution value being the second distribution value, and wherein the set of the channel instances is determined based on the quantity.

29. The system of claim 26, wherein the different device components include a first device component and a second device component, wherein the first device component includes one or more first partitions, and wherein the second device component includes one or more second partitions.

30. The system of claim 26, wherein the different device components include a first device component and a second device component, wherein the first device component includes one or more first virtual machines, and wherein the second device component includes one or more second virtual machines.

* * * * *